(12) United States Patent
Fetcenko et al.

(10) Patent No.: US 6,740,448 B2
(45) Date of Patent: May 25, 2004

(54) MODIFIED ELECTROCHEMICAL HYDROGEN STORAGE ALLOY HAVING INCREASED CAPACITY, RATE CAPABILITY AND CATALYTIC ACTIVITY

(75) Inventors: Michael A. Fetcenko, Rochester Hills, MI (US); Kwo Young, Troy, MI (US); Stanford R. Ovshinsky, Bloomfield Hills, MI (US); Benjamin Reichman, West Bloomfield, MI (US); John Koch, Brighton, MI (US); William Mays, Livonia, MI (US)

(73) Assignee: Ovonic Battery Company, Inc., Troy, MI (US)

( * ) Notice: Subject to any disclaimer, the term of this patent is extended or adjusted under 35 U.S.C. 154(b) by 37 days.

(21) Appl. No.: 09/859,164

(22) Filed: May 16, 2001

(65) Prior Publication Data

US 2003/0148180 A1 Aug. 7, 2003

Related U.S. Application Data

(62) Division of application No. 09/575,313, filed on May 19, 2000, now Pat. No. 6,461,766, and a division of application No. 09/290,633, filed on Apr. 12, 1999, now Pat. No. 6,270,719.

(51) Int. Cl.⁷ .......................... H01M 4/38; H01M 4/52; C22C 30/00
(52) U.S. Cl. ...................... 429/218.1; 420/588; 148/428
(58) Field of Search ................................ 420/588, 586, 420/586.1; 429/59, 101, 218.1, 218.2, 60; 148/428

(56) References Cited

U.S. PATENT DOCUMENTS

| | | | | | |
|---|---|---|---|---|---|
| 4,716,088 | A | * | 12/1987 | Reichman | 429/101 |
| 5,536,591 | A | * | 7/1996 | Fetcenko et al. | 429/59 |
| 5,616,432 | A | * | 4/1997 | Ovshinsky | 429/59 |
| 5,695,530 | A | * | 12/1997 | Hong | 29/623.1 |
| 5,840,440 | A | * | 11/1998 | Ovshinsky | 429/60 |
| 5,976,276 | A | * | 11/1999 | Sapru | 148/403 |
| 6,270,719 | B1 | * | 8/2001 | Fetcenko et al. | 420/588 |
| 6,461,766 | B1 | * | 10/2002 | Young et al. | 429/218.2 |

* cited by examiner

Primary Examiner—Mark Ruthkosky
(74) Attorney, Agent, or Firm—Dean B. Watson; Marvin S. Siskind

(57) ABSTRACT

A modified Ti—V—Zr—Ni—Mn—Cr electrochemical hydrogen storage alloy which has at least one of the following characteristics: 1) an increased charge/discharge rate capability over that the base Ti—V—Zr—Ni—Mn—Cr electrochemical hydrogen storage alloy; 2) a formation cycling requirement which is reduced to one tenth that of the base Ti—V—Zr—Ni—Mn—Cr electrochemical hydrogen storage alloy; or 3) an oxide surface layer having a higher electrochemical hydrogen storage catalytic activity than the base Ti—V—Zr—Ni—Mn—Cr electrochemical hydrogen storage alloy. The electrochemical hydrogen storage alloy includes an oxide surface having metallic particles dispersed therein, wherein the particles are from 10–40 Angstroms in size.

15 Claims, 10 Drawing Sheets

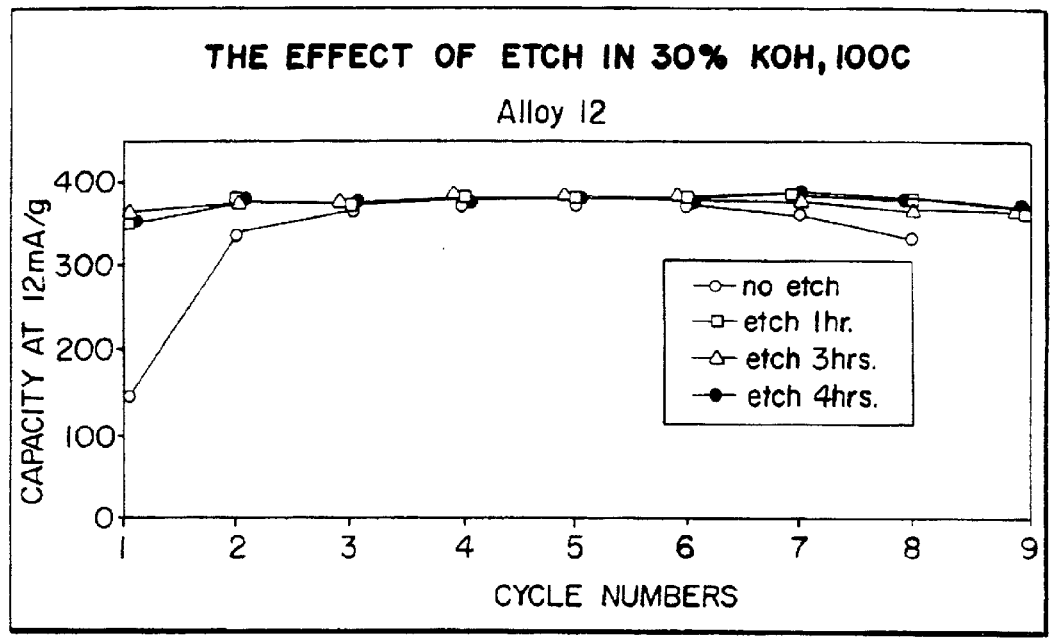
FIG-6a
FIG-6b
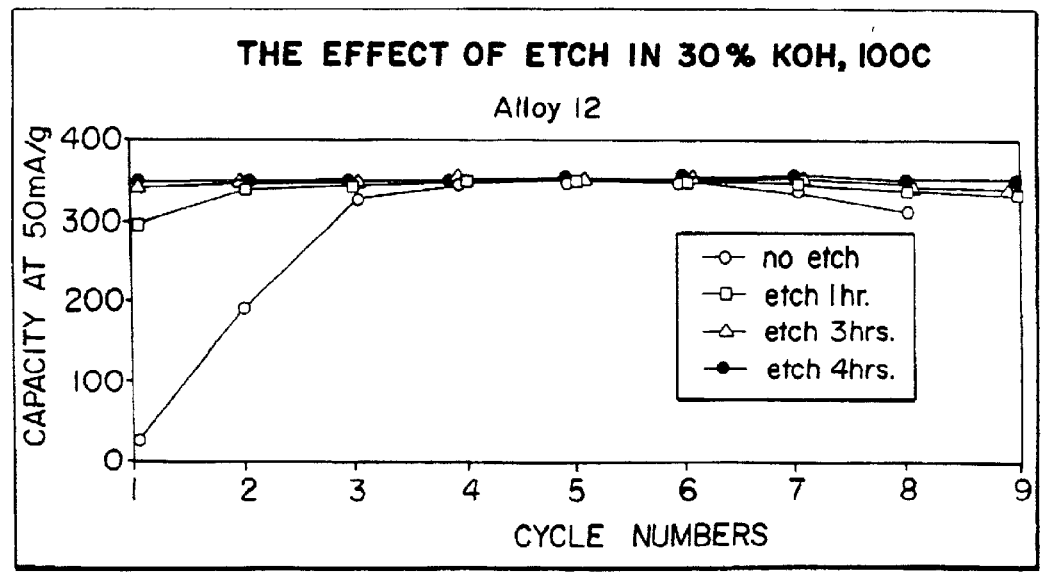

MODIFIED ELECTROCHEMICAL HYDROGEN STORAGE ALLOY HAVING INCREASED CAPACITY, RATE CAPABILITY AND CATALYTIC ACTIVITY

REFERENCE TO RELATED APPLICATIONS

The present invention is a divisional of U.S. patent application: Ser. No. 09/575,313 entitled "Hydrogen Storage Powder and Process for Preparing the Same" by Fetcenko et al., filed May 19, 2000, now U.S. Pat. No. 6,461,766, and U.S. patent application Ser. No. 09/290,633, entitled "Modified Electrochemical Hydrogen Storage Alloy Having Increased Capacity, Rate Capability, and Catalytic Activity" by Fetcenko et al., filed Apr. 12, 1999, now U.S. Pat. No. 6,270,719, the disclosures of which are herein incorporated by reference.

FIELD OF THE INVENTION

The instant invention involves electrochemical hydrogen storage alloys and more specifically to modified VTiZrNiCrMn alloys. Most specifically, the instant invention comprises a modified VTiZrNiCrMn-based alloy which has at least one of 1) an increased charge/discharge rate capability over that of the base VTiZrNiCrMn electrochemical hydrogen storage alloy, 2) a formation cycling requirement which is reduced to one tenth that of the base VTiZrNiCrMn electrochemical hydrogen storage alloy, or 3) an oxide surface layer having a higher electrochemical hydrogen storage catalytic activity than the base Ti—V—Zr—Ni—Mn—Cr electrochemical hydrogen storage alloy.

BACKGROUND OF THE INVENTION

In rechargeable alkaline cells, weight and portability are important considerations. It is also advantageous for rechargeable alkaline cells to have long operating lives without the necessity of periodic maintenance. Rechargeable alkaline cells are used in numerous consumer devices such as portable computers, video cameras, and cellular phones. They are often configured into a sealed power pack that is designed as an integral part of a specific device. Rechargeable alkaline cells can also be configured as larger cells that can be used, for example, in industrial, aerospace, and electric vehicle applications.

The materials proposed in the prior art for use as hydrogen storage negative electrode materials for secondary batteries are materials that have essentially simple crystalline structures. In simple crystalline materials, limited numbers of catalytic site are available resulting from accidently occurring, surface irregularities which interrupt the periodicity of the crystalline lattice. A few examples of such surface irregularities are dislocation sites. crystal steps, surface impurities and foreign absorbates. For more than three decades, virtually every battery manufacturer in the world pursued such crystalline electrode materials for electrochemical applications, but none produced a commercially viable nickel metal hydride battery until after the publication of U.S. Pat. No. 4,623,597 (the '597 patent) to Ovshinsky, et al, which disclosed fundamentally new principles of electrode material design.

As taught in the '597 patent (the contents of which are incorporated by reference), a major shortcoming of basing negative electrode materials on simple ordered crystalline structures is that irregularities which result in the aforementioned catalytically active sites occur relatively infrequently. This results in a relatively low density of catalytic and/or storage sites and consequently poor stability. Of equal importance is that the type of catalytically active sites available are of an accidental nature, relatively few in number and are not designed into the material as are those of the present invention. Thus, the efficiency of the material in storing hydrogen and its subsequent release is substantially less than that which would be possible if a greater number and variety of sites were available.

Ovshinsky, et al, fundamental principles overcome the limitations of the prior art by improving the characteristics of the negative electrode through the use of disordered materials to greatly increase the reversible hydrogen storage characteristics required for efficient and economical battery applications. By applying the principles of disorder, it has become possible to obtain a high energy storage, efficiently reversible, and high electrically efficient battery in which the negative electrode material resists structural change and poisoning, with improved resistance to the alkaline environment, good self-discharge characteristics and long cycle life and deep discharge capabilities. The resulting disordered negative electrode materials are formed from lightweight, low cost elements by techniques that assure formation of primarily non-equilibrium metastable phases resulting in high energy and power densities at low cost. These non-equilibrium, metastable phases assure the formation of localized states where a special degree of disorder, if properly fabricated, can come from the structural and compositional disorder of the material.

The materials described generally in the '597 patent have a greatly increased density of catalytically active sites providing for the fast and stable storage and release of hydrogen. This significantly improved the electrochemical charging/discharging efficiencies and also showed an increase in hydrogen storage capacity. Generally, this was accomplished by the bulk storage of hydrogen atoms at bonding strengths within the range of reversible electromotive force suitable for use in secondary battery applications. More specifically, such negative electrode materials were fabricated by manipulating the local chemical order and hence the local structural order by the incorporation of selected modifier elements into the host matrix to create the desired disorder, type of local order and metal hydrogen bond strengths. The resulting multicomponent disordered material had a structure that was amorphous, microcrystalline, multiphase polycrystalline (but lacking long range compositional order), or a mixture of any combination of these structures The host matrix of the materials described in the '597 patent were formed from elements capable of storing hydrogen an thus are considered hydride formers. This host matrix was modified by incorporating selected modifier elements which could also be hydride formers. These modifiers enhanced the disorder of the final material, thus creating a much greater number and spectrum of catalytically active sites with an increase in the number of hydrogen storage sites. Multiorbital modifiers (such as transition elements) provided the greatly increased number of sites due to various bonding configurations available. Because of more efficient storage and release of hydrogen and because of the higher density of the catalytic sites, the hydrogen more readily found a storage site. Unfortunately, there remained, until U.S. Pat. No. 5,840,440 ('440), an insufficient density of new hydrogen storage sites formed due to disorder to significantly increase the hydrogen storage capacity of the material.

The '597 patent describes the use of, inter alia, rapid quench to form disordered materials having unusual electronic configurations, which results from varying the three-dimensional interactions of constituent atoms and their various orbitals. Thus, it was taught that the compositional, positional and translational relationships of the constituent atoms were not limited by crystalline symmetry in their freedom to interact. Selected elements could be utilized to further control the disorder of the material by their interaction with orbitals so as to create the desired local internal chemical environments These various and at least partially unusual configurations generate a large number of catalytically active sites and hydrogen storage sites not only on the surface but throughout the bulk of the material. The internal topology generated by these various configurations allowed for selective diffusion of hydrogen atoms.

In general, disorder in the modified material can be of an atomic nature in the form of compositional or configurational disorder provided throughout the bulk of the material or in numerous regions or phases of the material. Disorder can also be introduced into the host matrix by creating microscopic phases within the material which mimic the compositional or configurational disorder at the atomic level by virtue of the relationship of one phase to another. For example, disordered materials can be created by introducing microscopic regions or phases of a different kind or kinds of crystalline phases, or by introducing regions of an amorphous phase or phases, or by introducing regions of an amorphous phase or phases in addition to regions of a crystalline phase or phases. The types of disordered structures that provide local structural chemical environments for improved hydrogen storage characteristics include amorphous materials, microcrystalline materials, multicomponent multiphase polycrystalline materials lacking long range composition order or multiphase materials containing both amorphous and crystalline phases.

Short-range, or local, order is elaborated on in U.S. Pat. No. 4,520,039 to Ovshinsky, entitled Compositionally Varied Materials and Method for Synthesizing the Materials the contents of which are incorporated by reference. This patent discloses that disordered materials do not require periodic local order and how spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment and/or orbital overlap plays a significant role physically, electronically, or chemically so as to affect physical properties and hence the functions of the materials. The elements of these materials offer a variety of bonding possibilities due to the multidirectionality of f-orbitals, d-orbitals or lone pair electrons. The multidirectionality ("porcupine effect") of d-orbitals provides for a tremendous increase in density of sites, the spectrum of types of sites and hence the presence of active storage sites. Following the teaching can result in a means of synthesizing new materials which are disordered in several different senses simultaneously.

The '597 patent is described in detail above because this patent represents a starting point for the investigation that resulted in the present invention. That patent introduced the concept of making negative electrode material for nickel metal hydride batteries from multicomponent disordered alloys. This teaching was diametrically opposed to the conventional "wisdom" of battery manufacturers at the time. It was not until this concept was adopted in production processes by said manufacturers that negative electrode materials with an increased number of catalytically active sites were produced and nickel metal hydride batteries became commercially viable. In capsule form, the '597 patent taught that significant additional sites for hydrogen catalysis (to allow the rapid storage and release of hydrogen and greatly improve stability) were formed and made available by purposely fabricating disordered negative electrode material (as opposed to the homogeneous, ordered polycrystalline material of the prior art). The '597 patent also proposed that the use of disorder could be employed to obtain additional hydrogen storage sites. However, it was not appreciated that in order to obtain a substantial increase in hydrogen storage capacity from such non-conventional storage sites, it would be necessary to increase the number of storage sites by approximately 3 orders of magnitude.

Not only was the teaching of the '597 patent adopted by all nickel metal hydride manufacturers, but in recent years some of these manufacturers have begun to use rapid solidification techniques (as taught by Ovshinsky) to increase the degree of disorder within a negative electrode alloy formula. For instance, battery companies have even gone so far as to rapidly quench highly-modified $LaNi_5$-type electrochemical negative electrode material. By employing nonequilibrium processing techniques, the resulting negative electrode material includes hydrogen storage phases and catalytic phases on the order of 2000 Angstroms in average dimension. The hydrogen storage capacity of the negative electrode material does not improve significantly, but the catalytic activity is greatly improved as evidenced by improved rate capability and stability to oxidation and corrosion, resulting in increased cycle life.

As mentioned above certain battery companies have begun to investigate the use of rapidly-quenched, highly modified LaNi, type hydrogen storage materials for electrochemical applications. For example, in Phys. Chem 96 (1992) No. 5 pp. 656–667, P. H. L. Notten, et al of Philips Research Laboratories presented a paper entitled "Melt-Spinning of $AB_{5.5}$-Type Hydride Forming Compounds and the Influence of Annealing on Electrochemical and Crystallographic Properties." In this paper, non-stoichiometric modified $LaNi_{5.5}$ materials, $La_6Nd_2Ni_3Co_{24}Si_1$ and $La_6Nd_2Ni_{26}Co_{24}Mo_1$ were rapidly solidified. These non-stoichiometric materials were compared to their stoichiometric counterparts with the result being that the non-stoichiometric materials demonstrated good, but not unusual hydrogen storage capacity. However, the non-stoichiometric compounds did show the presence of additional volume percents of a catalytic phase, which phase, as predicted by the '597 patent, was responsible for the improved electrochemical properties as compared to the properties found in the examples of stoichiometric material. Once again, and more importantly, no significantly higher density of non-conventional hydrogen storage sites were obtained. In research and development activities at Energy Conversion Devices, Inc. with highly modified TiNi-type electrochemical negative electrode materials, such as described in U.S. Pat. No. '440 which is incorporated herein by references, rapidly quenched electrode materials were melt spun. The work resulted in improved oxidation and corrosion resistance and cycle life was increased by a factor of five. On the other hand and as was true in the case of the aforementioned Japanese work, no significant increase in hydrogen storage capacity was demonstrated and the phases of the negative electrode material present were also relatively large.

Therefore, while the teachings of the '597 patent were revolutionary for those of ordinary skill in the art in learning to apply the principals of disorder disclosed therein to negative electrode materials to obtain commercial batteries with commercially viable discharge rates and cycle life stabilities while maintaining good hydrogen storage capacity, the '597 patent provided for the most part generalities to routineers concerning specific processes, processing techniques, alloy compositions, stoichiometries in those compositions, etc. regarding how to further significantly increase the hydrogen storage capacity (as opposed to the catalytic activity). It was not until the '440 patent that a teaching was presented of the nature and quantification of additional active storage sites required to significantly increase the hydrogen storage capacity of the negative electrode material through the deliberate introduction of defect sites and the presence of other concurrent non-conventional and/or conventional storage sites.

Despite the exceptional electrochemical performance now provided by current highly disordered nickel metal hydride systems (twice the hydrogen storage capacity of conventional NiCd systems) consumers are demanding increasingly greater run times, safety and power requirements from such rechargeable battery systems. No current battery system can meet these demands. Accordingly, there exists a need for a safe ultra high capacity, high charge retention, high power delivery, long cycle life, reasonably priced rechargeable battery system.

While U.S. Pat. No 5,840,440 ("the '440 patent") represents innovative Ideas with respect to useable storage sites in an electrochemical negative electrode material due to the use of high defect density and small crystallite size, the focus of the '440 patent is on the bulk properties of the hydrogen storage alloy. Significant discussion therein relates to increased surface sites; however, the additional sites so described relate to the interior surfaces, or grain boundaries, again within the alloy. The '440 patent does not address the interface between the metal hydride alloy and the electrolyte at the so-called oxide layer.

Of most relevance to the present invention is commonly assigned U.S. Pat. No. 5,536,591 ("the '591 patent") in which the oxide (metal/electrolyte) interface is addressed in detail and where teachings on composition, size and distribution of catalytic sites within the oxide interface was first provided.

The '591 patent taught that hydrogen storage and other electrochemical characteristics of the electrode materials thereof could be controllably altered depending on the type and quantity of host matrix material and modifier elements selected for making the negative electrode materials. The negative electrode alloys of the '591 patent were resistant to degradation by poisoning due to the increased number of selectively designed storage and catalytically active sites which also contributed to long cycle life. Also, some of the sites designed into the material could bond with and resist poisoning without affecting the active hydrogen sites. The materials thus formed had a very low self discharge and hence good shelf life.

As discussed in U.S. Pat. No. 4,716,088 ("the '088 patent"), the contents of which are specifically incorporated by reference, it is known that the steady state surface composition of V—Ti—Zr—Ni alloys can be characterized as having porous, catalytic regions of enriched nickel. An aspect of the '591 patent was a significant increase in the frequency of occurrence of these nickel regions as well as a more pronounced localization of these regions. More specifically, the materials of the '591 patent had discrete nickel regions of 50–70 Angstroms in diameter distributed throughout the oxide interface and varying in proximity from 2–300 Angstroms or preferably 50–100 Angstroms, from region to region. This was illustrated in the FIG. 1 or the '591 patent, where the nickel regions 1 were shown as what appear as particles on the surface of the oxide interface 2 at 178,000 X. As a result of the increase in the frequency of occurrence of these nickel regions, the materials of the '591 patent exhibited significantly increased catalysis and conductivity.

The increased density of Ni regions in the materials of the '591 patent provided metal hydride powder particles having a highly catalytic surface. Prior to the '591 patent, Ni enrichment was attempted unsuccessfully using microencapsulation. The method of Ni encapsulation results in the expensive physical, chemical or electrochemical deposition of a layer of Ni at the metal-electrolyte interface. The deposition of an entire layer was expensive, excessive and resulted in no improvement of performance characteristics since this kind of encapsulated layer did not result in the production of the localized, finely distributed nickel regions of 50–70 Angstrom in a porous matrix.

The enriched Ni regions of the '591 patent could be produced via two general fabrication strategies. The first of these strategies was to specifically formulate an alloy having a surface region that is preferentially corroded during activation to produce the described enriched Ni regions. It was believed that Ni was in association with an element such as Al at specific surface regions and that this element corroded preferentially during activation, leaving the enriched Ni regions described in the '591 patent. "Activation" as used herein specifically refers to "etching" or other methods of removing excessive oxides, such as described in the '088 patent as applied to electrode alloy powder, the finished electrode, or at any point in between in order to improve the hydrogen transfer rate.

The second of these strategies was to mechanically alloy a secondary alloy to a hydride battery alloy, where the secondary alloy preferentially corroded to leave enriched nickel regions. An example of such a secondary alloy was given as NiAl. The most preferred alloys having enriched Ni regions were alloys having the following composition: (Base Alloy)$_a$Co$_b$Mn$_c$Fe$_d$Sn$_e$; where the Base Alloy comprised 0.1 to 60 atomic percent Ti, 0.1 to 40 atomic percent Zr, 0 to 60 atomic percent V, 0.1 to 57 atomic percent Ni, and 0 to 56 atomic percent Cr; b was 0 to 7.5 atomic percent; c was 13 to 17 atomic percent; d was 0 to 3.5 atomic percent; e was 0 to 1.5 atomic percent; and a+b+c+d+e=100 atomic percent.

The production of the Ni regions of the '591 patent was consistent with a relatively high rate of removal through precipitation of the oxides of titanium and zirconium from the surface and a much lower rate of nickel removal, providing a degree of porosity to the surface The resultant surface had a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode was more catalytic and conductive than if the surface contained a higher concentration of insulating oxides. Many of the alloys of the '591 patent include Mn. The effects of the addition of Mn to these alloys was generally discussed in U.S. Pat. No. 5,096,667, the disclosure of which is incorporated herein by reference. The addition of Mn usually results in improved charging efficiency. This effect appears to result from the ability of Mn to improve the charging efficiency of alloys into which it is added by improving oxidation resistance and oxygen recombination. It has been observed that oxygen gas generated at the nickel hydroxide positive electrode recombined at the surface of the metal hydride electrode. Oxygen recombination is an especially aggressive oxidizer of its environment, even compared to the alkaline electrolyte.

It is possible that the modifier elements added to the Base Alloy of the '591 patent, particularly Mn and Fe, and most particularly Co, either alone, or in combination with Mn and/or Al for example, act to catalyze oxygen reduction, thereby avoiding or reducing the oxidation of the surrounding elements in the metal hydride alloy. It is believed that this function of the modified alloys reduces or even eliminates the formation and build up of detrimental surface oxide, thereby providing a thinner and more stable surface.

It is believed that several additional factors may explain the unexpected behavior of Mn and Fe in the Base Alloys of the present invention: (1) The combination of Mn and Fe may affect the bulk alloy by inhibiting the bulk diffusion rate of hydrogen within the metal through the formation of complex phase structures, either by effecting the grain boundaries or by affecting the equilibrium bond strength of hydrogen within the metal. In other words, the temperature dependence of the hydrogen bond strength may be increased thereby decreasing the available voltage and capacity available under low temperature discharge. (2) It is believed that the combination of Mn and Fe may result in a lower electrode surface area for metallurgical reasons by increasing the ductility of the alloy and thereby reducing the amount of surface area formation during the activation process. (3) It is believed that the combination of Mn and Fe to these alloys may inhibit low temperature discharge through the alteration of the oxide layer itself with respect to conductivity, porosity, thickness, and/or catalytic activity. The oxide layer is an important factor in the discharge reaction and promotes the reaction of hydrogen from the Base Alloy of the present invention and hydroxyl ion from the electrolyte. It is believed that this reaction is promoted by a thin, conductive, porous oxide having some catalytic activity.

The combination of Mn and Fe does not appear to be a problem under room temperature discharge, but has shown a surprising tendency to retard the low temperature reaction. The formation of a complex oxide could result in a subtle change in oxide structure such as pore size distribution or porosity. Since the discharge reaction produces water at the metal hydride surface and within the oxide itself, a small pore size may be causing a slow diffusion of $K^+$ and $OH^+$ ions from the bulk of the electrolyte to the oxide Under room temperature discharge where polarization is almost entirely ohmic to low temperature discharge where activation and concentration polarization components dominate the physical structure of the oxides with Fe and Mn compared to Mn alone could be substantially different.

Still another possible explanation is that Mn and Fe have multivalent oxidation states. Some elements within the oxide may in fact change oxidation state during normal state of charge variance as a function of the rate of discharge and can be both temperature, fabrication, and compositionally dependent. It is possible these multiple oxidation states have different catalytic activity as well as different densities that together effect oxide porosity. A possible problem with a complex oxide containing both Mn and Fe could be that the Fe component retards the ability of the Mn to change oxidation state if present in large quantities.

Throughout the preceding discussion with respect to the oxide it should be noted that the oxide also contains other components of the Base Alloy, such as V, Ti, Zr, Ni, and/or Cr and other modifier elements. The discussion of a complex oxide of Mn and Fe is merely for the sake of brevity and one skilled in the art should not infer that the actual mechanism cannot also include a different or more complex explanation involving other such elements.

DEFICIENCIES OF THE PRIOR ART

While prior art hydrogen storage alloys frequently incorporate various individual modifiers and combinations of modifiers to enhance performance characteristics, there is no clear teaching of the role of any individual modifier, the interaction of any modifier with other components of the alloy, or the effects of any modifier on specific operational parameters. Because highly modified $LaNi_5$ alloys were being analyzed from within the context of well ordered crystalline materials, the effect of these modifiers, in particular, was not clearly understood.

Prior art hydrogen storage alloys, when incorporated into batteries, have generally exhibited improved performance attributes, such as cycle life, rate of discharge, discharge voltage, polarization, self discharge, low temperature capacity, and low temperature voltage. However, prior art alloys have yielded batteries that exhibit a quantitative improvement in one or two performance characteristic at the expense of a quantitative reduction in other performance characteristics Electrical formation is defined as charge/discharge cycling required to bring the batteries up to their ultimate performance. For prior art alloys, electrical formation is essential for maximum battery performance at both high and low discharge rates. For instance certain prior art VTiZrNi-CrMn alloys could require as many as 32 cycles of charge and discharge at various rates to fully form the electric vehicle battery. It is believed that this electrical formation causes expansion and contraction of the negative electrode alloy material as it alternately stores and releases hydrogen. This expansion and contraction induces stress and forms in-situ cracks within the alloy material. The cracking increases the surface area, lattice defects and porosity of the alloy material. Heretofore, NiMH batteries have required this electrical formation treatment.

There is no "set-in-stone" method of electrical formation. The reason for this is that different active metal hydride materials which have been prepared by different methods under different conditions, and formed into electrodes by different methods will require different electrical formation processing. Hence, no detailed method of electrical formation suitable for all batteries can be described. However, generally electrical formation involves a relatively complex procedure of cycling the prepared battery through a number of charge/discharge cycles at varying rates of charge/discharge to varying depths of charge/discharge.

This electrical formation requirement puts an additional financial burden on commercial battery manufacturers. That is, it requires the manufacturers to purchase capital equipment in the form of battery chargers and also requires the cost of labor and utilities to run the equipment. These costs are significant and are passed on to the consumer. Therefore, there remains a need in the art for an electrochemical hydrogen storage alloy which requires little or no electrical formation.

The chemical/thermal activation of the electrochemical hydrogen storage alloys involves a relatively lengthy period of immersing the alloy material (in powder or electrode form) into a concentrated potassium hydroxide or sodium hydroxide solution, preferably at an elevated temperature. In situ treatment of the electrodes in the battery is limited to a temperature of about 60° C. because of the separators used therein. In powder form, the temperature limit is higher. The normal maximum concentration of potassium hydroxide is about 30% by weight KOH in water. The required residence time depends on temperature and concentration, but is typically a few days for the finished batteries. Information on chemical/thermal activation of electrochemical hydrogen storage alloys is provided in the '088 patent. This again is another added cost for the manufacturer. The costs of raw materials such as KOH or NaOH and water, the cost of disposing of spent chemicals, the energy costs to heat the alloy materials and the KOH solution, the labor and inventory costs, and the time costs all make it desirable to reduce or eliminate this activation process. Therefore, there is a need in the art to develop an electrochemical hydrogen storage alloy which requires little or no chemical/thermal activation.

Additionally, prior art alloys have all been designed for ultimate capacity, and have not been designed for the high rate requirements of HEV use and the like. Prior art VTiZrNiCrMn alloys have a specific capacity of 380–420 mAh/g in electrode form. Recently, there has been increased demand for rechargeable batteries having higher power and rate capabilities in addition to the high energy.

Finally, prior art alloys having high electrochemical storage capacity have lacked a very highly catalytic surface. Some prior art alloys had a catalytic surface, but it was limited. Higher catalytic activity allows for higher exchange currents and thereby higher rate capabilities. Also, the surface area of the alloy affects the exchange current. That is, the higher the surface area, the greater the exchange current. Therefore, there is a need in the art for electrochemical hydrogen storage alloys which have a greater surface catalytic activity as well as a greater surface area.

SUMMARY OF THE INVENTION

The above deficiencies are remedied by a modified Ti—V—Zr—Ni—Mn—Cr electrochemical hydrogen storage alloy which has at least one of the following characteristics: 1) an increased charge/discharge rate capability over that the base Ti—V—Zr—Ni—Mn—Cr electrochemical hydrogen storage alloy; 2) a formation cycling requirement which is significantly reduced over that of the base Ti—V—Zr—Ni—Mn—Cr electrochemical hydrogen storage alloy; or 3) an oxide surface layer having a higher electrochemical hydrogen storage catalytic activity than the base Ti—V—Zr—Ni—Mn—Cr electrochemical hydrogen storage alloy.

The modified Ti—V—Zr—Ni—Mn—Cr electrochemical hydrogen storage alloy comprises, in atomic percentage: (Base Alloy)$_a$Co$_b$Fe$_c$Al$_d$Sn$_e$, where said Base Alloy comprises 0.1 to 60% Ti, 0.1 to 40% Zr, 0 to 60% V, 0.1 to 57% Ni, 5 to 22% Mn and 0 to 56% Cr; b is 0.1 to 10.0%; c is 0 to 3.5%; d is 0.1 to 10.0%; e is 0.1 to 3.0%; and a+b+c+d+e=100%.

BRIEF DESCRIPTION OF THE DRAWINGS

FIGS. 6a and 6b depict the effect of alkaline etching on alloy-012, specifically depicted are plots of capacity versus cycle number at 12 and 50 mA/g discharge, respectively;

DETAILED DESCRIPTION OF THE INVENTION

Figure 1:
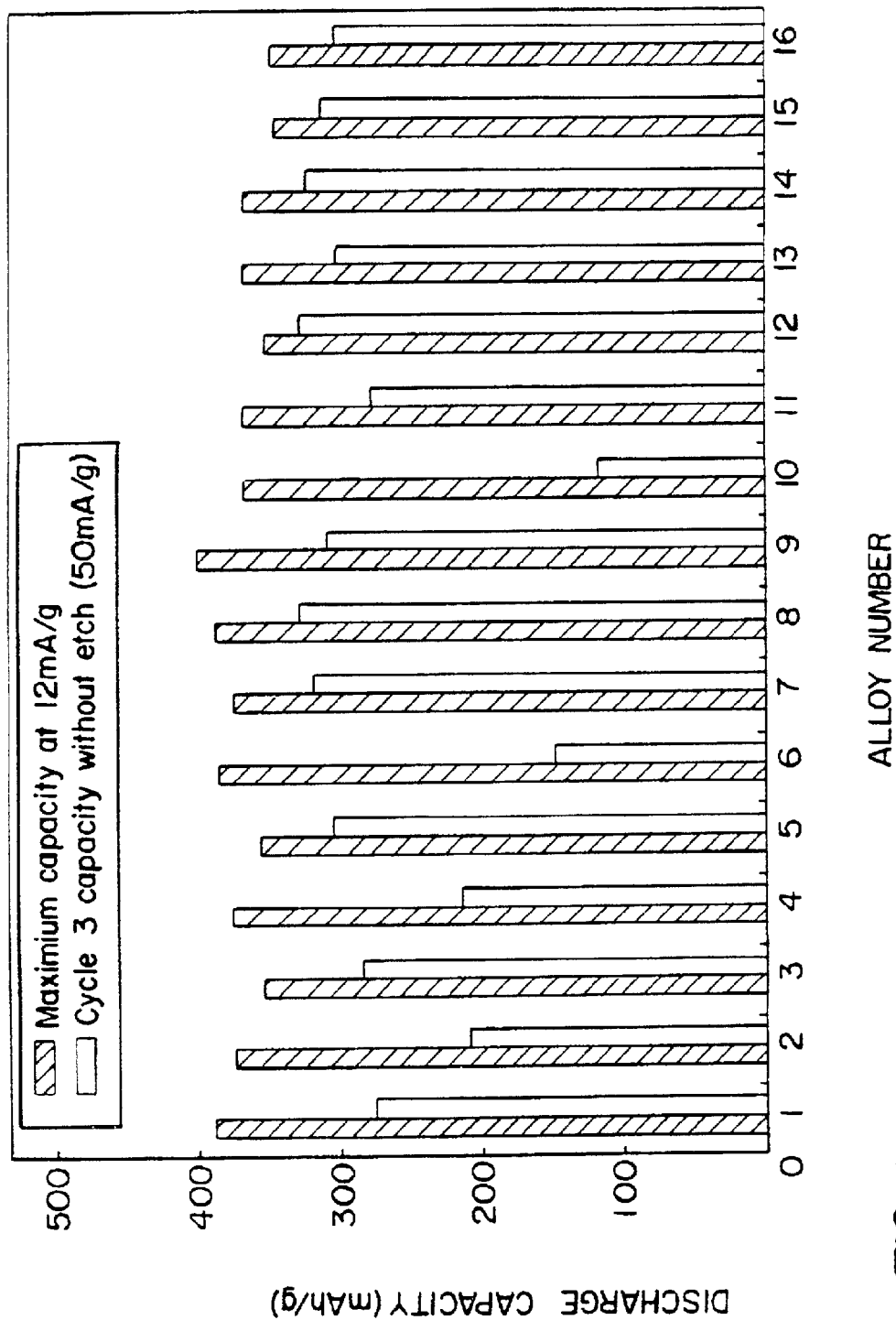
FIG. 1 depicts Electrochemical capacity of 16 alloys at discharge currents of 50 and 12 mA/g, without alkaline etching.

The deficiencies of the prior art are overcome by the instant modified VTiZrNiCrMn electrochemical hydrogen storage alloy. In order to improve the catalytic activity of the prior art negative hydride alloys, the base alloy material was modified by the addition of one or more elements to increase the surface area of the heat-activated alloys and to enhance the catalytic nature of the surface of the materials. In addition to VTiZrNiCrMn, the alloys also contain Al, Co, and Sn. The alloy has an increased charge/discharge rate capability over that of the base VTiZrNiCrMn electrochemical hydrogen storage alloy. It also has an electrical formation cycling requirement which is reduced to one tenth that of the base VTiZrNiCrMn electrochemical hydrogen storage alloy. A chemical/thermal activation is required by the base VTiZrNiCrMn electrochemical hydrogen storage alloy. Finally the alloy has an oxide surface layer having a higher electrochemical hydrogen storage catalytic activity and higher surface area than the base VTiZrNiCrMn electrochemical hydrogen storage alloy. Each of these properties will be discussed in detail hereinbelow.

Catalytic Activity

The '591 patent, discussed hereinabove, represents the best prior art teaching of the desirable properties of the metal/electrolyte interface, or surface oxide of the metal hydride material. providing specific teaching on the role of metallic nickel sites as catalytic sites. The '591 patent also describes the nickel sites as approximately 50–70 Angstroms in size, with a broad proximity range of 2–300 Angstroms. With respect to proximity, the STEM micrographs provided suggest approximately 100–200 Angstrom proximity as following the teaching of the '591 patent.

To distinguish the alloys of the present invention over those of the '591 patent, the inventors have discovered superior catalysis and high rate discharge performance can be achieved by one or more of the following:
1) the catalytic metallic sites of the inventive alloys are formed from a nickel alloy such as NiMnCoTi rather than just Ni;
2) the catalytic metallic sites of the inventive alloys are converted by elemental substitution to an FCC structure from the BCC structure of the prior art Ni sites;

3) the catalytic metallic sites of the inventive alloys are much smaller in size (10–50, preferably 10–40, most preferably 10–30 Angstroms) than the Ni sites of the prior art alloys (50–70 Angstroms) and have a finer distribution (closer proximity);

4) the catalytic metallic sites of the inventive alloys are surrounded by an oxide of a multivalent material (containing $MnO_x$) which is believed to possibly be catalytic as well, as opposed to the ZrTi oxide which surrounded the prior art Ni sites;

5) the oxide could also be multiphase with very small (10–20 Angstrom) Ni particles finely distributed in a MnCoTi oxide matrix;

6) the oxide may be a mix of fine and coarse grained oxides with finely dispersed catalytic metallic sites:

7) alloy modification with aluminum may suppress nucleation of large (50–70 Angstrom) catalytic metallic sites (at 100 Angstrom proximity) into a more desirable "catalytic cloud" (10–20 Angstroms in size and 10–20 Angstroms proximity);

8) NiMn oxide is the predominant microcrystalline phase in the oxide and the catalytic metallic sites may be coated with NiMn oxide.

The instant alloys, therefore, distinguish over the '591 alloys in that: 1) the catalytic metallic sites are still present but may be nickel alloy and are much smaller and more finely divided; 2) the old TiZr oxide support is replaced by a NiMnCoTi oxide which is more catalytic and more porous; and 3) aluminum metal doping provides a very fine grain catalytic metallic site environment.

EXAMPLE I

Sn, Co, Al, and Fe were considered as additives to a base $AB_2$ alloy. Sixteen different chemical formulas were designed according to the orthogonal array used in the Taguchi method to minimize the total number of alloys needed to complete the design matrix. Each element has four different levels; i.e., Sn (0.4, 0.6, 0.8, 1.0), Co (0, 0.5, 1.0, 1.5), Al (0, 0.4, 0.8, 1.2), Fe (0, 0.4, 0.8, 1.2), as shown in Table 1 (all numbers are in atomic percentages). Alloy-01 is the base formula (control) with only 0.4% Sn originating from one of the source materials (zircalloy in replacement of zirconium) to reduce raw materials cost.

TABLE 1

| Alloy # | Element Concentration (Atomic %) | | | | | | | | | | Capacity (mAh/g) |
|---|---|---|---|---|---|---|---|---|---|---|---|
| | Sn | Co | Al | Fe | V | Ti | Zr | Ni | Cr | Mn | |
| 01 | 0.4 | 0.0 | 0.0 | 0.0 | 5.0 | 9.0 | 26.6 | 38.0 | 5.0 | 16.0 | 390 |
| 02 | 0.4 | 0.5 | 0.4 | 0.4 | 5.0 | 9.0 | 26.6 | 38.0 | 4.5 | 15.2 | 382 |
| 03 | 0.4 | 1.0 | 0.8 | 0.8 | 5.0 | 9.0 | 26.6 | 38.0 | 4.0 | 14.4 | 375 |
| 04 | 0.4 | 1.5 | 1.2 | 1.2 | 5.0 | 9.0 | 26.6 | 38.0 | 3.5 | 13.6 | 375 |
| 05 | 0.6 | 0.0 | 0.4 | 0.8 | 5.0 | 9.0 | 26.4 | 38.0 | 5.0 | 14.8 | 379 |
| 06 | 0.6 | 0.5 | 0.0 | 1.2 | 5.0 | 9.0 | 26.4 | 38.0 | 4.5 | 14.8 | 387 |
| 07 | 0.6 | 1.0 | 1.2 | 0.0 | 5.0 | 9.0 | 26.4 | 38.0 | 4.0 | 14.8 | 376 |
| 08 | 0.6 | 1.5 | 0.8 | 0.4 | 5.0 | 9.0 | 26.4 | 38.0 | 3.5 | 14.8 | 389 |
| 09 | 0.8 | 0.0 | 0.8 | 1.2 | 5.0 | 9.0 | 26.2 | 38.0 | 5.0 | 14.0 | 401 |
| 10 | 0.8 | 0.5 | 1.2 | 0.8 | 5.0 | 9.0 | 26.2 | 38.0 | 4.5 | 14.0 | 374 |
| 11 | 0.8 | 1.0 | 0.0 | 0.4 | 5.0 | 9.0 | 26.2 | 38.0 | 4.0 | 15.6 | 370 |
| 12 | 0.8 | 1.5 | 0.4 | 0.0 | 5.0 | 9.0 | 26.2 | 38.0 | 3.5 | 15.6 | 385 |
| 13 | 1.0 | 0.0 | 1.2 | 0.4 | 5.0 | 9.0 | 26.0 | 38.0 | 5.0 | 14.4 | 369 |
| 14 | 1.0 | 0.5 | 0.8 | 0.0 | 5.0 | 9.0 | 26.0 | 38.0 | 4.5 | 15.2 | 369 |
| 15 | 1.0 | 1.0 | 0.4 | 1.2 | 5.0 | 9.0 | 26.0 | 38.0 | 4.0 | 14.4 | 335 |
| 16 | 1.0 | 1.5 | 0.0 | 0.8 | 5.0 | 9.0 | 26.0 | 38.0 | 3.5 | 15.2 | 339 |

All sixteen alloys were prepared by induction melting under an argon atmosphere with commercially available raw materials. The melt size ranged from 20 to 60 kg depending on the crucible size been used. After reaching 1600° C., the melt was held at that temperature for 20 minutes to homogenize it. Afterwards, the liquid was cooled down to 1300° C. and tilt-poured into a carbon steel mold. The ingots thus obtained were pulverized by a hydride/dehydride process without mechanical grinding as indicated in U.S. application Ser. No. 09/141,668, filed Aug. 27, 1998, entitled A METHOD FOR POWDER FORMATION OF A HYDROGEN STORAGE MATERIAL, herein incorporated by reference. Powder of 200 mesh or smaller was roll-milled onto a Ni-mesh substrate without other conducting metal powder or inorganic additives. The electrochemical capacity of each alloy was determined by constructing a flooded full cell using grafted PE/PP separators, partially pre-charged $Ni(OH)_2$ counter electrodes, and 30% KOH solution as the electrolyte The cells were charged at 50 mA/g for 13 hours and then discharge at 50 mA/g and a final pull current at 12 mA/g.

The discharge capacity for the third cycle at 50 and 12 mA/g for each alloy are plotted in FIG. 1. This figure indicates that alloy-12 shows the smallest differential between capacities at 50 and 12 mA/g, which indicates a good high-rate material.

Electrical Formation Cycling

Electrical formation or workup cycling of NiMH type batteries, as discussed herein above, has previously been a requirement for alkaline type batteries. This electrical formation was required to bring the battery to full capacity and especially full power. Without such formation, the batteries perform below maximum capability. Typical formation entails cycling the virgin battery many times at differing charge/discharge rates. For example, the base alloy, having a nominal composition (in atomic %) Ti 9.0%, Zr 27.0%, V 5.0%, Ni 38.0%, Cr 5.0%, and Mn 16.0%, required 32 charge/discharge cycles to achieve full power. Particularly in the area of electric vehicles, where power translates into acceleration of the vehicle, formation cycling is an expensive process with respect to equipment, processing time and inventory control. Any reduction in the number of cycles required to form the battery to it's full capability reduces the cost of manufacturing.

The instant alloy materials have been specifically designed to speed up formation. To that end, the instant alloy materials have reduced the electrical formation requirement thereof to just three cycles in consumer, cylindrical cells and also EV batteries. This reduction in formation cycles is ten fold over the prior art base alloy. Therefore, production times and costs are reduced, and throughput is increased.

EXAMPLE II

Figure 2:
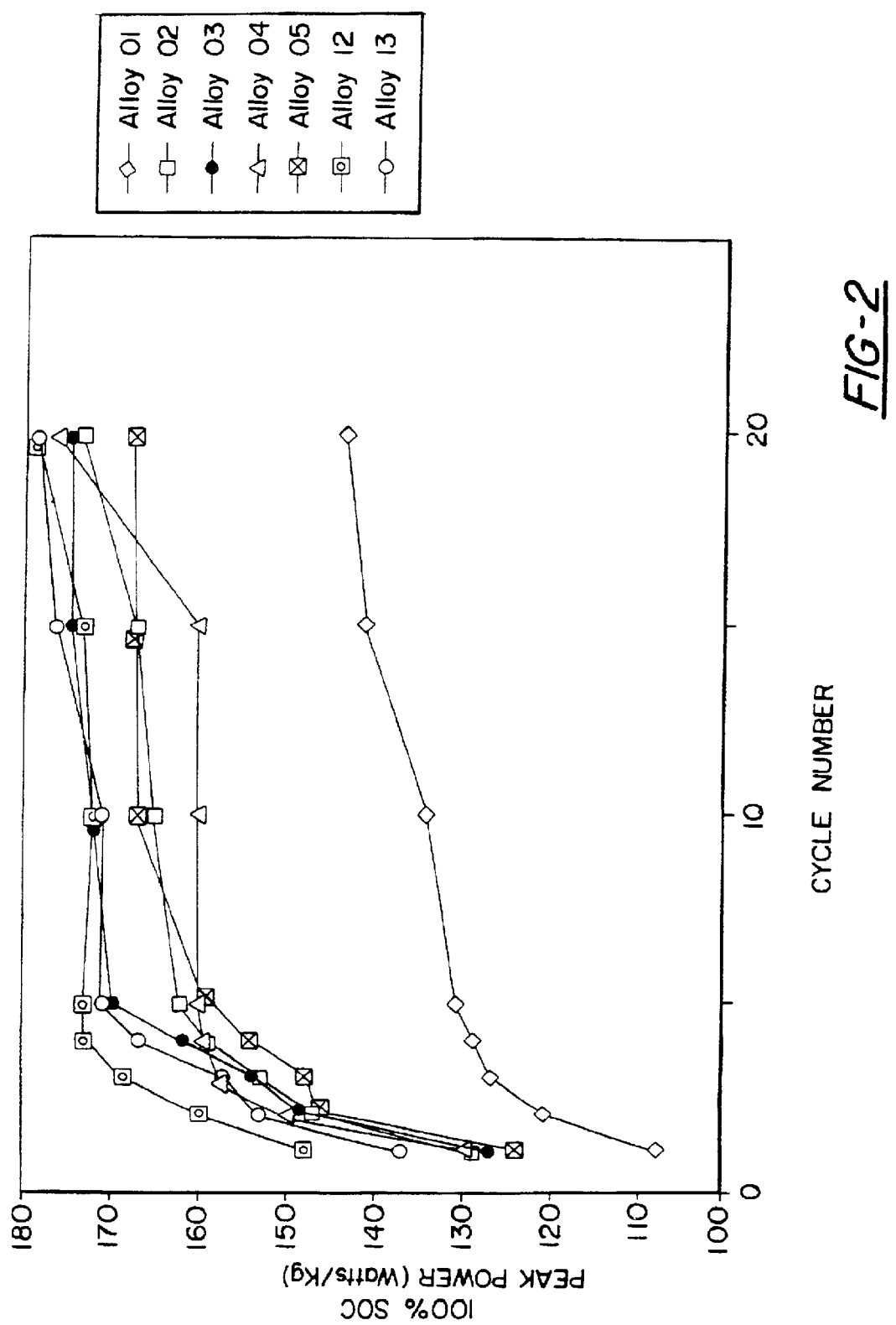
FIG. 2 plots the peak power in W/Kg versus cycle number for alloys 01, 02, 03, 04, 05, 12, and 13.

C-size cylindrical batteries were constructed using the alloys fabricated from example I as negative electrode. These cells included paste $Ni(OH)_2$ as the positive electrodes and 30% KOH solution as electrolyte. The peak power of the battery was measured by the pulse discharge method and the results of a few key alloys are plotted in FIG. 2 as a function of cycle number. It is clear from the figure that alloys -02, -03, -04, -05, -12, and -13 all have higher peak power than the control (alloy-01). Especially alloy-12 which reached it's full rate capability after only three electrical formation cycles. This is a dramatic improvement over alloy-1 for which more than 15 cycles are needed.

EXAMPLE III

Figure 3A:
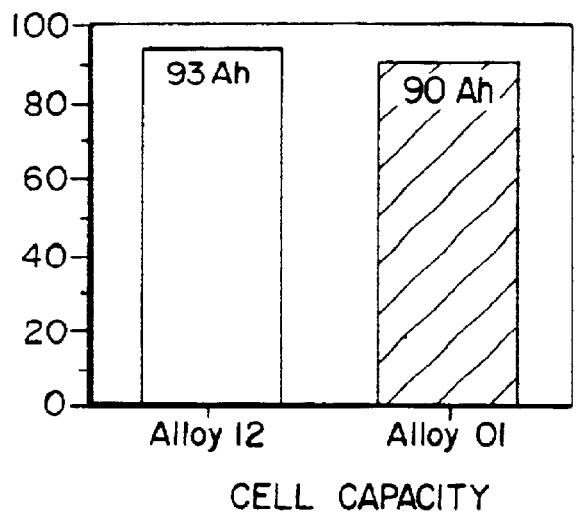
FIGS. 3a–3c plot cell capacity, number of electrical formation cycles and peak power at 50% depth of discharge (at room temperature), respectively for alloys 01 and 12.
Figure 3B:
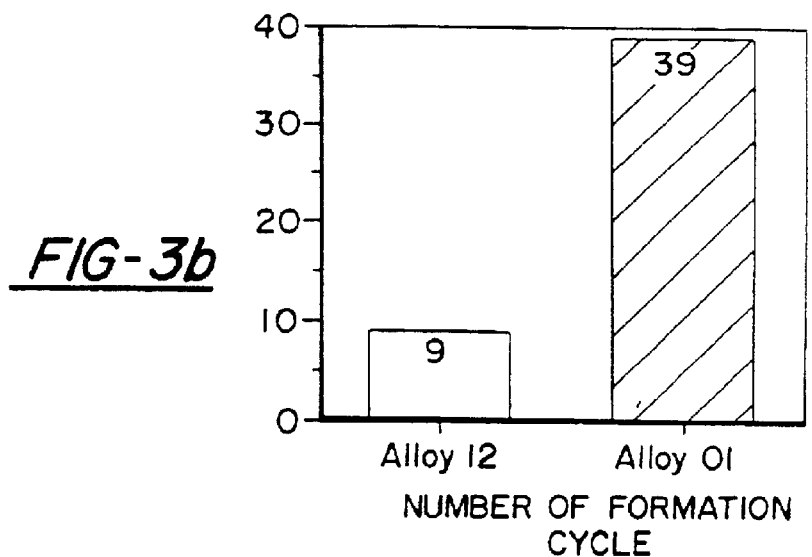
Figure 3C:
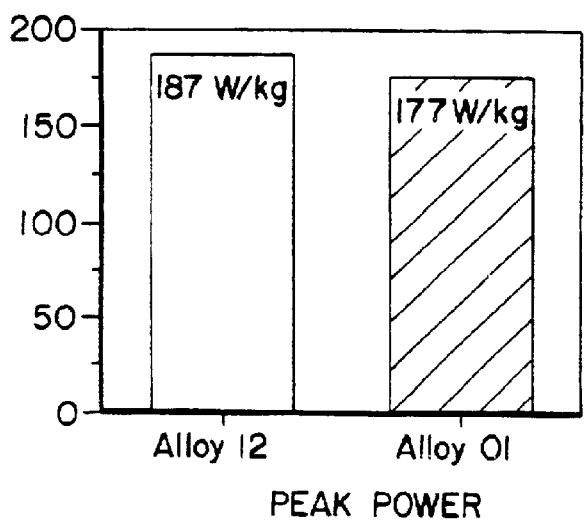

Both electrodes from alloy-01 and alloy-12 were made into identical prismatic cells for electrical vehicle application (90 Ah by design). Testing results for these cells are summarized in FIGS. 3a, 3b and 3c. Both cells reached their designed capacity and power after 5 days of heat treatment at 60° C. and various number of mini-cycles for electrical formation. Cell employing alloy-12 showed marginal advantages in both capacity and power. However, the most significant finding is that the number of mini-cycles needed to achieve the maximum power was dramatically reduced from 39 (alloy-01) to 9 (alloy-12), which offers a substantial cost reduction in capital equipment and electricity.

Figure 4:
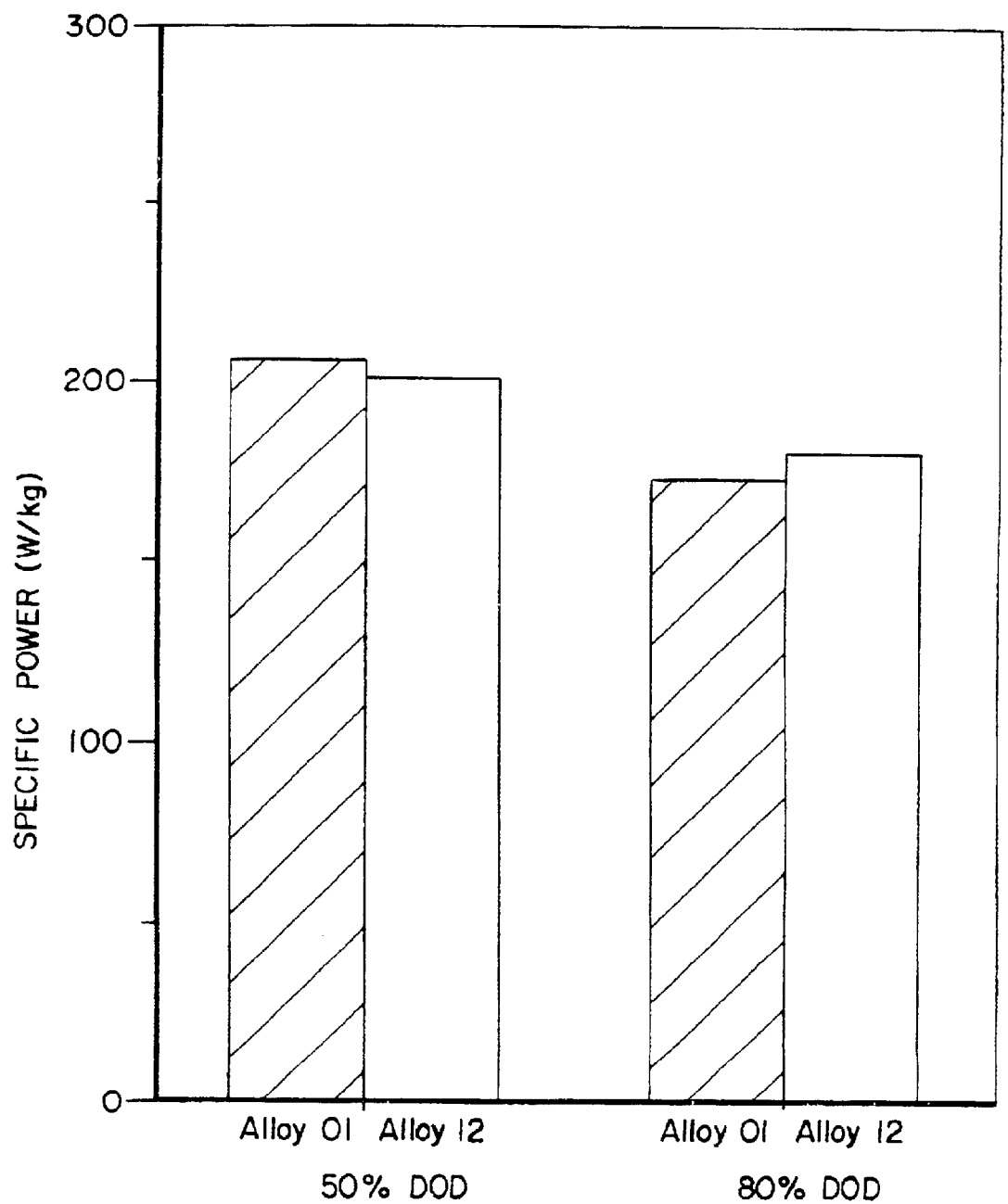
FIG. 4, plots the specific power (W/Kg) at 50 and 80% depth of discharge for alloys 01 and 12.

The electrical formation was further studied to take full advantage of alloy-12. Instead of the typical 37 hours of electrical formation for alloy-01, the whole formation process can be reduced to 12 hours by using alloy-12. The final capacity and specific power were not affected by this aggressive formation scheme, ash show in FIG. 4.

Chemical/Thermal Activation

EXAMPLE IV

Figure 5A:
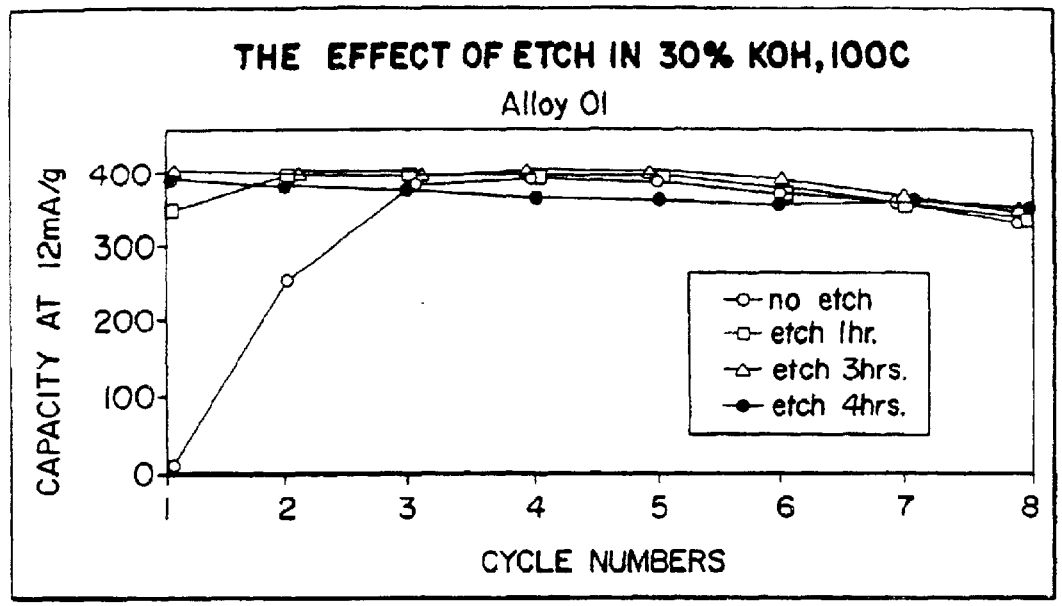
FIGS. 5a and 5b depict the effect of alkaline etching on alloy-01, specifically depicted are plots of capacity versus cycle number at 12 and 50 mA/g discharge, respectively.
Figure 5B:
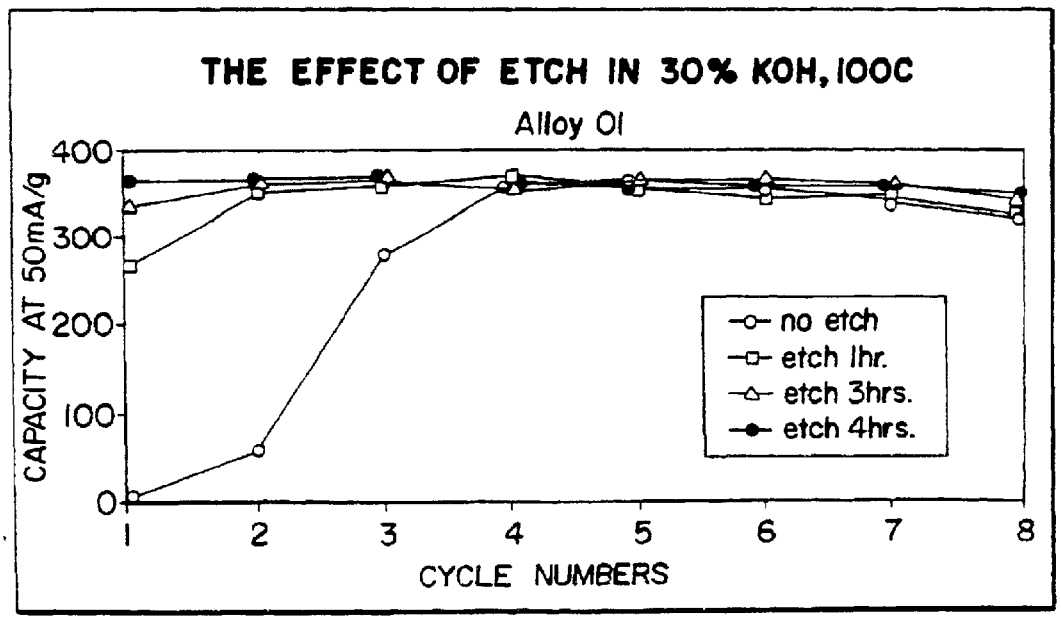

All sixteen alloys obtained from Example I were examined after various etching conditions. This alkaline etch was designed to simulate the heat formation process during battery fabrication. Electrodes were cut into proper size (2 by 5 inches) and etched in a 100° C. 30% KOH solution for 1, 3, and 4 hours. Etched electrodes together with unetched electrodes were used to construct flooded full cells using graft PE/PP separators, partially pre-charged $Ni(OH)_2$ counter electrodes, and 30% KOH solution electrolyte. The cells were charged at 50 mA/g for 13 hours and then discharge at 50 mA/g and a final pull at 12 mA/g. The capacities under various etching conditions are plotted as a function of cycle number in FIGS. 5a and 5b for the alloy-01 and FIGS. 6a and 6b for alloy-12 respectively. It is found that alloy-12 is easier to form (reaching full capacity and rate capability within fewer cycles) when compared to the alloy-01.

Catalytic Activity & Rate Capability

The instant alloy materials have far outdistanced Misch metal nickel based metal hydride alloys. The rate of catalytic surface activity of the instant alloys and rate of bulk diffusion of hydrogen are similar. Therefore, neither process inhibits the rate of charge/discharge, when compared to the other. In fact, because of the improvements in catalytic surface activity, the instant alloys have much improved discharge rate capability, i.e. as much as 300% greater rate capability. This, as will be discussed further herein below, appears to be caused by the enhanced oxide layer of the instant alloy materials.

Electrochemical studies were conducted to characterize the newly developed derivative alloys and compare their properties with alloy-01 material. The study helped to better understand the nature of the changes occurring at the surface of alloy-01 as a result of the compositional and structural modifications and the relation of these changes to the increased catalytic activity and rate capability of the material.

AC Impedance-Surface Kinetic and Diffusion Properties

Figure 7:
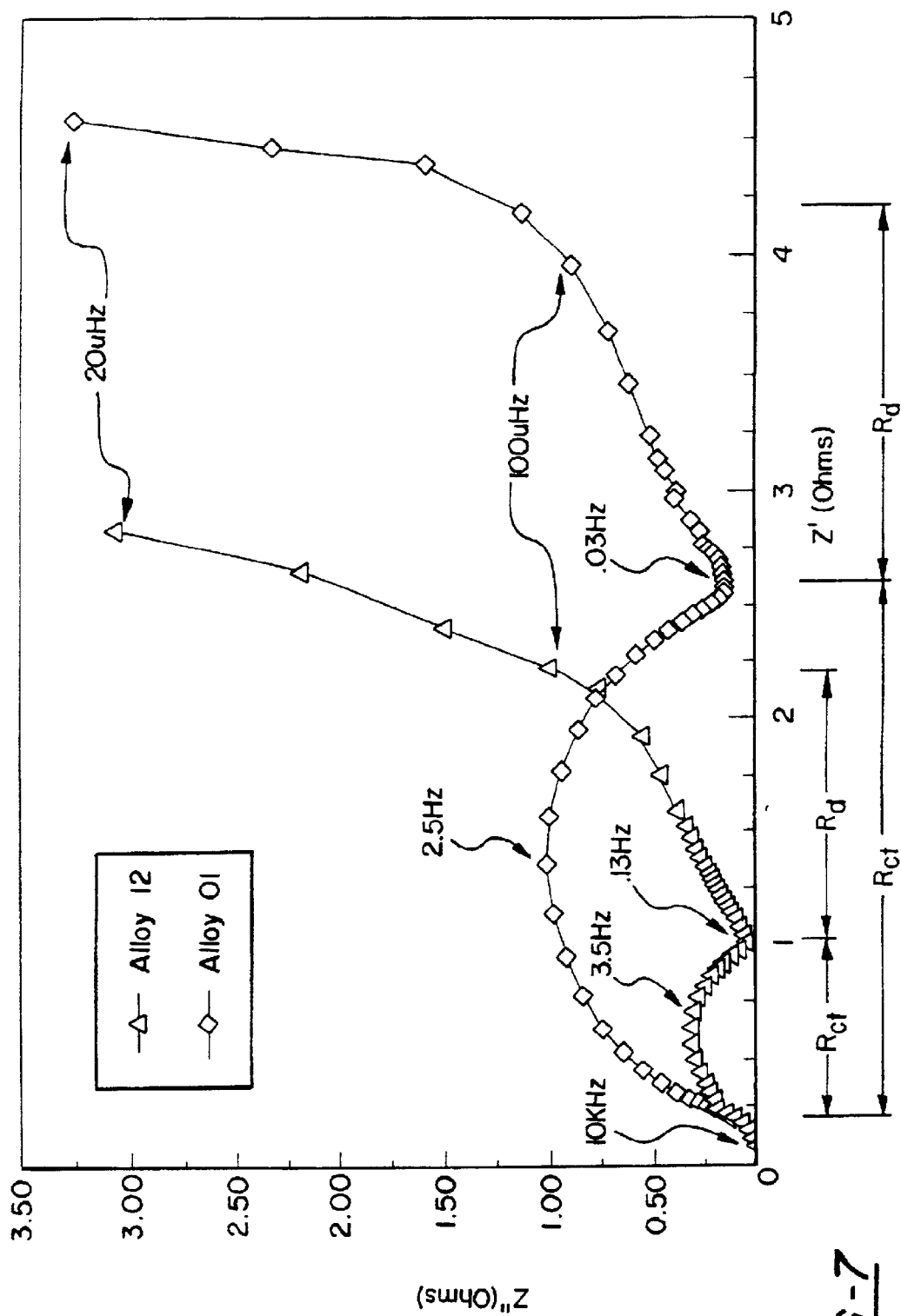
FIG. 7 plots AC impedance (Nyquist plots) at 85% state of charge (SOC) of thermal/chemical activated negative electrodes prepared from base alloy-01 and from alloy-12 of the instant invention.

FIG. 7 shows AC impedance plots (Nyquist plots) at 85% state of charge (SOC) of thermal/chemical activated negative electrodes prepared from the alloy-01 and alloy-12. The main semicircle in the impedance plots of FIG. 7 is due to the charge transfer which occurs at the surface of the MH electrode. The hydrogen species formed at this step are adsorbed to the electrode's surface. The diameter of this circle represents the charge transfer resistance $R_\alpha$ of the hydride reaction. At frequencies lower than that of the charge transfer semicircle. the impedance is attributed to the absorption of the hydrogen below the surface of the metal. This step is followed by the bulk diffusion step in which the absorbed hydrogen species diffuse into the bulk of the metal hydride material. The absorption step gives rise to a small semicircle at the lower frequency range of the impedance plots and the bulk diffusion step gives rise to the straight, Warburg, behavior observed at lower frequency range of the impedance plots. Following the Warburg region, the impedance turns into a 90° capacitive line due the fact that the hydrogen diffusion occurs through a finite length.

The impedance behavior shown in FIG. 7 therefore support a three step mechanism as described in the following equations:

(A) $M + H_2O + e^- \leftrightarrows MH_{ad} + OH^-$    Charge Transfer (B) $MH_{ad} \leftrightarrows MhabS$    Absorption (C) $MH_{abS} \leftrightarrows MhabB$    Bulk Diffusion Where $MH_{ad}$, is the adsorbed hydrogen, $MH_{abS}$ is the absorbed hydrogen just below the surface and $MH_{abB}$ is the absorbed hydrogen in the bulk of the negative material. The charge transfer step (A) controls the impedance of the electrode at the high frequency range. At lower frequencies, the bulk diffusion process dominates the impedance.

Surface kinetics

The surface kinetics of the hydride reaction is measured by the charge transfer resistance ($R_\alpha$) or the exchange current ($I_0$). $I_0$ is related to $R_\alpha$ by the equation:

$$I_0 = RT/nFR_\alpha \qquad (1)$$

Table 2 shows the charge transfer resistances obtained from the impedance plots of FIG. 7 and the exchange currents for alloy-01 and alloy-12. As Table 2 shows the exchange current for the 2.7% Co, Al, Sn modified alloy-12 is 2–3 times larger than that of alloy-01, indicating faster charge transfer kinetic by the same proportion.

TABLE 2

| Alloy | $R_{ct}$(ohm.g) | $I_0$(mA/g) |
|---|---|---|
| Alloy-01 | 0.4 | 65 |
| Alloy-12 | 0.17 | 155 |

The magnitude of the exchange current ($I_0$) is generally determined by the catalytic activity of the electrode surface measured by the exchange current density ($i_0$) and by the specific surface area (A) of the electrode. In order to understand better how each of these parameters contribute to the increase in charge transfer kinetics observed in the derivative alloys, the values of $i_0$ and A for the different electrodes were also measured. The double layer capacitance ($C_{dl}$) of the electrodes calculated from the ac impedance plots of FIG. 7 were used to determine the surface area A of the different electrodes. To calculate the surface area from $Cd_{dl}$, a specific capacitance of 20 uF/cm² (a common literature value) was assumed. The exchange current densities of the different electrodes were calculated using the relationship $$i_0 = I_0/A \times 100 \qquad (2)$$

where $i_0$ in equation 2 is in mA/cm², $I_0$ is in mA/g and A is in m²/g. Table 3 shows the values of $I_0$ $C_{dl}$, A and $i_0$ for alloy-01 and alloy-12.

TABLE 3

| Alloy | $I_0$(mA/g) | $C_{dl}$(Far/g) | A(m²/g) | $10^2 \times$ $I_0$(mA/cm²) |
|---|---|---|---|---|
| Alloy-01 | 65 | 0.16 | 0.8 | 0.8 |
| Alloy-12 | 155 | 0.26 | 1.3 | 1.2 |

As Table 3 shows, both the surface area and the exchange current densities are higher in alloy-12 electrodes as compared to alloy-01 electrodes. Calculations from Table 3 show that for alloy-12 about 50% of the increase in the exchange current ($I_0$) can be attributed to the higher surface area of these materials and about 50% of the increase can be attributed to the higher exchange current densities of these materials as compared to alloy-01. The higher surface area of the alloy-12 electrodes with respect to alloy-01 electrodes occurred during the heat activation of the electrodes since ac impedance measurements showed that the surface area of these electrodes in the virgin state were similar to each other. The heat activation process helps to increase the surface area of the electrodes. The results presented here show that the modifying elements added to alloy-01 serve an important role in creating higher surface area due to their dissolution at the surface during the heat activation process. The higher exchange current densities of alloy-12 as compared to the base alloy indicates the added elements not only contributed to the increase in surface area of the electrodes but also contribute to the enhancement in the catalytic nature of the materials by changing the surface composition.

Though not wishing to be bound by theory, it is possible the oxide surface area is substantially increased by a mechanism similar to that in which Co, Al, and Sn modification causes the nickel catalytic sites to be reduced from 50–70 Angstroms to 10 Angstroms. It is possible in the VTiZrNi-CrMn prior art material, that two mechanisms control 50–70 Angstroms size sites. First, microcrystallite size within the bulk alloy may inherently influence resultant Ni sites after oxidation of the remaining elements. It is more likely, however, that the dissolution, erosion and corrosion of the resultant oxide is influenced by its chemical makeup. For example, in a prior art oxide matrix dominated by TiZr oxide, which is relatively insoluble, corrosion/erosion may occur in large chunks of 50–70 Angstrom size, while the Sn, Al, Co modified materials may be corroding on an atomic basis on the order of 10 Angstroms. Al and Sn may be particularly crucial in this regard in that they may be bonded to Ni within the surface oxide but dissolve in a "finer" or less "chunky" manner than VTiZr oxides.

Bulk Diffusion

From the ac impedance plots of FIG. 7, the diffusion rate of hydrogen in the bulk material can also be determined. While the surface kinetics determine the power capability of the electrode and batteries which use them, the diffusion rate determines the rate capability. The diffusion rate of the hydrogen species is reflected in the impedance of the electrodes at the lower frequency range of the impedance plots of FIG. 7. $R_d$ is related to the diffusion coefficient of the hydrogen species ($D_H$) and to the diffusion length (I) by equation 3:

$$R_d = V_M/ZFa(dE/dy)(I/3D) \quad (3)$$

where $V_M$ is the molar volume of the electrode material, Z is the charge per hydrogen atom absorbed, F is Faraday number, a is the geometric surface area of the electrode and (dE/dy) is the change of equilibrium potential of the electrode per unit change of hydrogen absorption. This parameter was obtained from measured data of equilibrium potential versus state of charge of the electrodes and was calculated to be approximately 0.06V at a state of charge between 85% to 50%. D and I are the diffusion coefficient and diffusion length respectively. Assuming a diffusion length equal to the electrode thickness, the hydrogen diffusion coefficient of the different alloy materials could be calculated. Table 4 shows the diffusion resistance obtained from the Nyquist plot of FIG. 7 and the diffusion coefficient calculated for alloy-01 and alloy-12. The diffusion coefficient of alloy-12 is larger, giving rise to a proportionally higher diffusion rate and better rate capability for alloy-12.

Though not wishing to be bound by theory, the mechanism through which the Sn, Co, Al modified alloys may have improved bulk hydrogen diffusion rates may be related to one or more of the following:
1. refinement of microstructure towards smaller crystallite sizes, which in turn promotes grain boundaries and hydrogen transport;
2. higher hydrogen equilibrium pressure; or
3. finer dispersion of catalytic sites within the bulk (similar to surface oxide).

TABLE 4

| Alloy | $R_d$(ohm) | D(cm²/sec) |
|---|---|---|
| Alloy-01 | 1.4 | 3.9 × 10⁻⁸ |
| Alloy-12 | 0.97 | 5.6 × 10⁻⁸ |

Cell Performance

Figure 8:
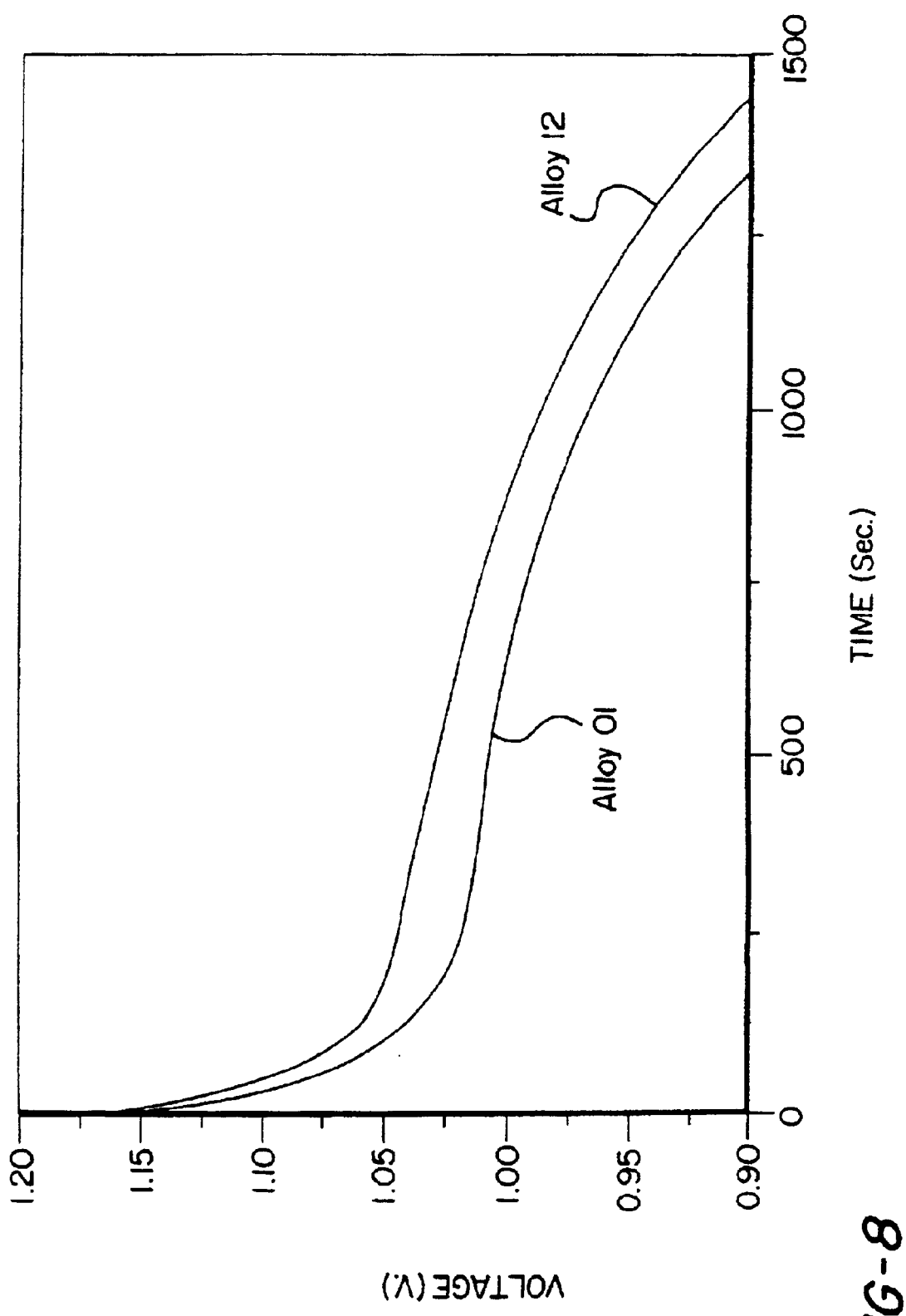
FIG. 8 plots discharge curves at 2C rate for C-cells manufactured using negative electrodes fabricated from base alloy-01 and from alloy-12 of the instant invention, it should be noted that the higher power capability demonstrated by alloy-12 in half cell measurements was also reflected in the performance of the C-cells.
Figure 9:
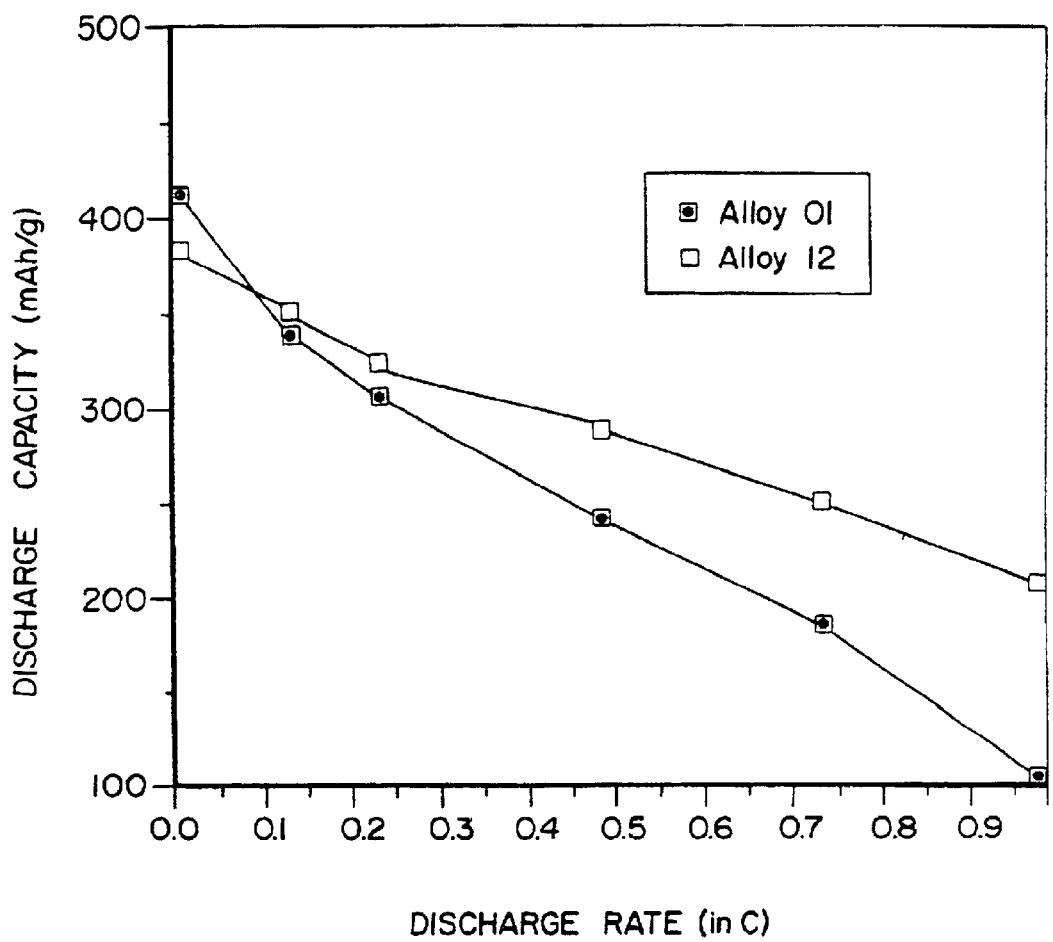
FIG. 9 shows the half cell capacity as a function of discharge rate, again, the electrodes using alloy-12 electrodes exhibited better rate capability.

The performance of the different negative electrodes was also studied in cylindrical C-cells. FIG. 8 shows discharge curves at 2C rate of C-cells manufactured using negative electrodes fabricated from alloy-01 and from alloy-12. As FIG. 8 shows, the cells using alloy-12 exhibited higher operating voltages reflecting superior power capability. FIG. 9 shows the capacity of electrodes fabricated from alloys -01 and -12. C-cells using the alloy-12 electrodes exhibited better rate capability.

Analytical Study-The Oxide Surface

The oxide surface of the instant alloys is the same thickness as that of the prior art alloys, however, the instant inventors have noticed that the modification of the alloys has affected the oxide surface in several beneficial ways. First the oxide accessibility has been affected. That is, the additives to the alloy have increased the porosity and the surface area of the oxide. This is believed to be caused by Al, Sn and Co. The modifiers added to the alloy are readily soluable in the electrolyte, and believed to "dissolve" out of the surface of the alloy material, leaving a less dense, more porous surface into which the electrolyte and ions can easily diffuse.

Second, the inventors have noted that the derivative alloys have a higher surface area than the prior art alloys. It is believed that the mechanical properties of the alloy (i.e. hardness, ductility, etc.) has been affected. This allows the material to be crushed easier, and allows for more microcracks to be formed in the alloy material during production and also easier in-situ formation of microcracks during electrochemical formation.

Finally, the inventors have noted that the alloys are more catalytically active than the prior art alloys. This is believed to be cause by a more catalytic active oxide surface layer. This surface layer, as is the case with some prior art materials (see for example U.S. Pat. No. 5,536,591 to Fetcenko et al.,) includes nickel particles therein. These nickel particles are believed to provide the alloy with its surface catalytic activity. In the instant alloy, the inventors believe there are a number of factors causing the instant increase in catalytic surface activity. First, the inventors believe that the nickel particles are smaller and more evenly dispersed in the oxide surface of the instant alloy materials. The nickel particles are believed to be on the order of 10 to 50 Angstroms in size. Second, the inventors believe that the nickel particles may also include other elements such as cobalt, manganese and iron. These additional elements may enhance the catalytic activity of the nickel particles, possibly by increasing the roughness and surface area of the nickel catalytic sites themselves. Third, the inventors believe that the oxide layer itself is microcrystalline and has smaller crystallites than prior art oxide. This is believed to increase catalytic activity by providing grain boundaries within the oxide itself along which ions, such as hydrogen and hydroxyl ions, may move more freely to the nickel catalyst particles which are situated in the grain boundaries. Finally, the instant inventors have noted that the concentrations of cobalt, manganese and iron in the oxide surface are higher than in the bulk alloy and higher than expected in the oxide layer.

The surface area of the base alloy increased by about a factor of two during the activation treatment, the inventive alloy increases in surface area by about a factor of four. As discussed earlier, the higher surface area of the inventive alloy is only partially responsible for the higher catalytic property of these alloys. As the ac impedance measurements demonstrated, the better catalytic activity of the surface of the inventive alloy also contributes to the enhanced catalytic behavior thereof.

Hence, the improved power and rate capability of the inventive alloys is the result of the higher surface area within the surface oxide as well as improved catalytic activity within the oxide due to the smaller size and finer dispersion of the nickel catalyst particles compared to prior art materials. Observations from high resolution scanning transmission electron microscopy (STEM) included presence of nickel catalyst "clouds" having a size in the 10–30 Angstrom range and extremely close proximity, on the order of 10–20 and 10–50 Angstrom distance. Another contributing factor to the improved catalysis within the oxide is the transformation of the supporting oxide in which the Ni particles reside. In prior art materials, the supporting oxide may be primarily rare earth or TiZr based oxides while in the case of the inventive materials, the support oxide is now comprised of at least regions of NiCoMnTi "super catalysts." This could also be NiMn regions surrounded by TiZr oxide. These super catalysts show a surprising lack of oxygen based on Electron Energy Loss Spectroscopy (EELS). It may be possible these regions are partially metallic or in a low oxidation state.

Another observation with the inventive materials is that prior art nickel catalytic regions within the oxide were bcc crystallographic orientation based on Select Area Electron Diffraction (SAED), which the inventive materials were observed to have an fcc orientation. It may be possible that the catalytic regions of Ni have been partially substituted by Co, Al, Mn, Sn, or other elements which have shifted the crystallographic orientation. It is indeed likely the bcc to fcc Ni shift reflects a higher degree of substitution.

Though not wishing to be bound by theory, it is also possible the fcc Ni in conjunction with NiCoMnTi regions and TiZr oxide may form a super lattice which may further promote ionic diffusion and reaction. Still another theory based on analytical evidence suggests that metallic Ni particles reside in a Mn oxide support. The presence of the Mn oxide is intriguing in that $MnO_x$ is multivalent and could promote catalysis via changing oxide states during the charge/discharge reactions.

Finally, another interpretation of the analytical evidence suggests even a multiphase surface oxide. In addition to metallic Ni or Ni alloys, there appears to exist both a fine grained and coarse grained support oxide. Perhaps the course grained aspect to the surface is dominated by TiZr prior art style oxide while the appearance of the fine grained support oxide in the inventive materials may be the MnOx or NiMnCoTi oxide or a MnCoTi oxide. The difficulty in assigning these structures more specifically resides in the very invention itself, i.e. the extremely small size and fine distribution. Even state of the art analytical instruments using electron probes, etc., have some kind of analytical region where averaging is taking place. Difficulty in assignment is mainly due to overlap of these extremely fine regions with one another during analysis.

In this context, one key role of Al,Sn,Co modification in these alloys may be as a "poison to the surface", inhibiting the growth of large Ni particles. In other words, these specific dopants may be viewed as metallic catalysts and support oxide dispersants.

EXAMPLE V

Performance of negative electrodes produced with alloys of the instant invention can be further optimized by adjusting the melt-casting conditions of the alloys. For example, a flat slab mold was used to increase the quench rate during casting relative to the conventional cylindrical mold used in Example 1. The ingots obtained from the slab mold have an average thickness of less than about 5 inches and preferably less than about one inch as compared with 10 inch thick ingots obtained from the cylindrical mold.

Figure 10:
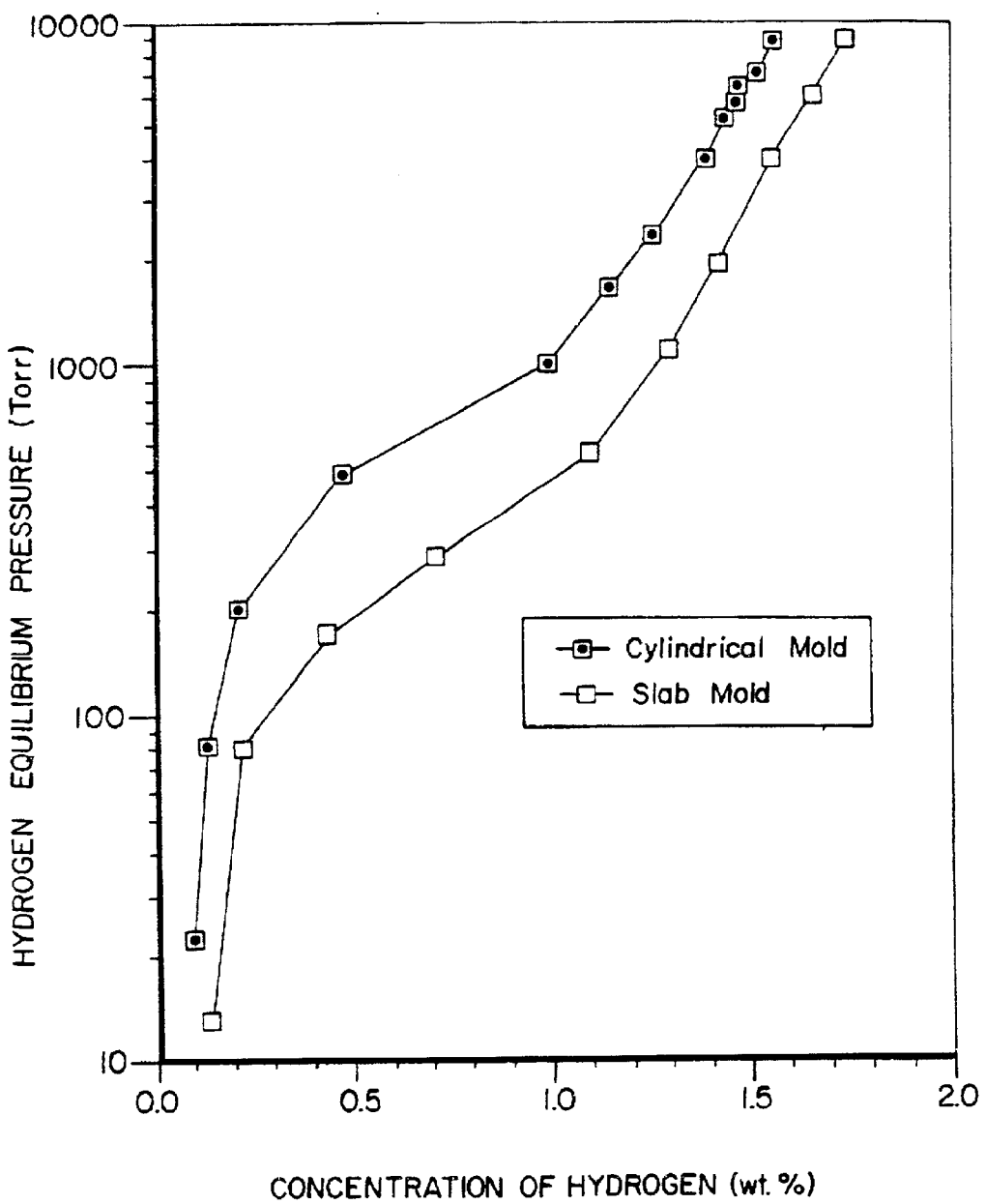
FIG. 10 plots the pressure-concentration isotherm (PCT) curve of alloy-12 cooled in a cylindrical mold verses a flat slab shaped mold which has a higher overall cooling rate.

The pressure-concentration isotherm (PCT) curves of alloy-12 from both casting methods are plotted in FIG. 10. From this figure, one can easily identify the superiority of faster solidification via the slab mold as compared with the slower cooling of the cylindrical mold by the extended curve into higher hydrogen storage. Electrodes were formed from alloy material from both ingots and subjected to half-cell testing as taught in Example 1 The results, which are listed in Table 5, confirm the PCT predictions about capacity. Not only did the full capacity increase from 355 mAh/g for the cylindrical mold to 395 mAh/g for the slab mold, but the capacity loss at high rate discharge was less for the slab mold. These increases in capacity can be directly related to higher power in the finished battery.

TABLE 5

| Mold Type | Capacity @ 50 mA/g | Capacity @ 12 mA/g |
|---|---|---|
| Cylindrical | 329 mAh/g | 355 mAh/g |
| Slab | 376 mAh/g | 395 mAh/g |

We claim:

1. An electrochemical hydrogen storage alloy comprising an oxide surface having metallic catalytic particles dispersed therein, wherein said metallic catalytic particles are from 10–40 Angstrom, in size.

2. The electrochemical hydrogen storage alloy of claim 1, wherein said metallic catalytic particles are from 10–30 Angatroms in size.

3. The electrochemical hydrogen storage alloy of claim 2, wherein said metallic catalytic particles are from 10–20 Angstrom, in size.

4. The electrochemical hydrogen storage alloy of claim 1, wherein said metallic catalytic particles are Ni-Mn-Co-Ti alloy catalytic particles.

5. The electrochemical hydrogen storage alloy of claim 1, wherein said metallic catalytic particles are finely dispersed in said oxide from 10–20 Angstroms apart.

6. The electrochemical hydrogen storage alloy of claim 1, wherein said metallic catalytic particles include particles that have a face centered cubic crystalline structure.

7. The electrochemical hydrogen storage alloy of claim 1, wherein said oxide comprises multivalent $MnO_x$ add.

8. The electrochemical hydrogen storage alloy of claim 1, wherein aid oxide comprises an oxide of Mn and Ni.

9. The electrochemical hydrogen storage alloy of claim 1, wherein said oxide comprises an oxide of Mn, Ni, Co, Ti and optionally Fe, if Fe is present in the alloy.

10. The electrochemical hydrogen storage alloy of claim 1, wherein said oxide comprises an oxide of Mn, Co and Ti.

11. The electrochemical hydrogen storage alloy of claim 1, wherein said oxide comprises mixed fine and coarse grained oxides.

12. The electrochemical hydrogen storage alloy of claim 1, wherein said alloy comprises comprises Al, Co, and Sn.

13. The electrochemical hydrogen storage alloy of claim 12, further comprising 0.1 to 10.0% Al, 0.1 to 10.0% Co, 0 to 3.5% Fe and 0.1 to 3.0% Sn.

14. The electrochemical hydrogen storage alloy of claim 13, comprising, in atomic percentage, Ti 9.0%, Zr 26.2%, V 5.0%, Ni 38.0%, Cr 3.5%, Co 1.5%, Mn 15.6%, Al 0.4%, and Sn 0.8%.

15. The electrochemical hydrogen storage alloy of claim 1, wherein said oxide surface comprises TiZr oxide, face centered cubic nickel particles, and regions of NiCoMnTi, said TiZr oxide, face centered cubic nickel particles, and regions of NiCoMnTi interacting to form a super lattice which promotes ionic diffusion and reaction.

* * * * *